United States Patent
Young et al.

(10) Patent No.: US 7,219,013 B1
(45) Date of Patent: May 15, 2007

(54) METHOD AND SYSTEM FOR FAULT DETECTION AND EXCLUSION FOR MULTI-SENSOR NAVIGATION SYSTEMS

(75) Inventors: Shih-Yih R. Young, Marion, IA (US); Gary A. McGraw, Cedar Rapids, IA (US)

(73) Assignee: Rockwell Collins, Inc., Ceder Rapids, IA (US)

( * ) Notice: Subject to any disclaimer, the term of this patent is extended or adjusted under 35 U.S.C. 154(b) by 881 days.

(21) Appl. No.: 10/631,314

(22) Filed: Jul. 31, 2003

(51) Int. Cl.
*G01C 21/00* (2006.01)
(52) U.S. Cl. .................. 701/214; 701/221; 701/34; 342/357.14
(58) Field of Classification Search .............. 701/213, 701/214, 221, 222, 220, 29, 33, 34, 35; 342/357.02–357.14
See application file for complete search history.

(56) References Cited

U.S. PATENT DOCUMENTS

| | | | |
|---|---|---|---|
| 6,311,129 B1 * | 10/2001 | Lin ........................ | 701/214 |
| 6,424,914 B1 * | 7/2002 | Lin ........................ | 701/214 |
| 6,515,618 B1 * | 2/2003 | Lupash .................. | 342/357.02 |
| 6,549,829 B1 * | 4/2003 | Anderson et al. ........ | 701/16 |

OTHER PUBLICATIONS

Brenner, M., "Integrated GPS/Inertial Fault Detection Availability", ION GPS-95, Palm Springs, CA, Sep. 12-15, 1995, pp. 1949-1958.

Vanderwerf, K., "FDE Using Multiple Integrated GPS/Inertial Kalman Filters in the Presence of Temporally and Spatially Correlated Ionospheric Errors", ION GPS-2001, Salt Lake City, UT, Sep. 11-14, 2001, pp. 2676-2685.

Diesel, J., Luu, S., "GPS/IRS AIME: Calculation of Thresholds and Protection Radius Using Chi-Square Methods", ION GPS-95, Palm Springs, CA, Sep. 12-15, 1995, pp. 1959-1964.

Brumback, B. D. Srinath, M. D., "A Chi-Square Test for Fault Detection in Kalman Filters", *IEEE Transactions on Automatic Control*, vol. AC-32, No. 6, Jun. 1987, pp. 552-554.

Young, E. S. Y., McGraw, G.A., Driscoll, B. T., "Investigation and Comparison of Horizontal Protection Level and Horizontal Uncertainty Level in FDE Algorithms", ION GPS-96, Kansas City, MO, Sep. 17-20, 1996, pp. 1607-1614.

Brown, R. G., Chin, G. Y., "GPS RAIM Calculation of Threshold and Protection Radius Using Chi-Square Methods—A Geometric Approach", *Red Book Series, vol. V, of the Institute of Navigation on Global Positioning System*, The Institute of Navigation, Alexandria, VA, 1998, pp. 155-178.

(Continued)

*Primary Examiner*—Richard M. Camby
(74) *Attorney, Agent, or Firm*—Nathan O. Jensen; Kyle Eppele

(57) ABSTRACT

A new Fault Detection and Exclusion (FDE) approach for tightly integrated GPS/inertial sensors that combines a normalized solution separation for fault detection and a residual monitoring scheme for fault exclusion is described. The computation of the detection threshold, the horizontal protection level and the horizontal uncertainty level are also presented. This new FDE algorithm is designed to enable the tightly integrated GPS/inertial sensor to be used as a primary means of navigation sensor for civil aviation.

20 Claims, 3 Drawing Sheets

OTHER PUBLICATIONS

Parkinson, B. W., Axelrad, P., "Autonomous GPS Integrity Monitoring Using the Pseudorange Residual", *NAVIGATION, Journal of the Institute of Navigation*, vol. 35, No. 2, Summer 1988, pp. 255-274.

Young, R. S. Y., "Oceanic/Remote FDE Algorithm Design", internal memo, Rockwell Collins Inc., Aug. 16, 1996

Lee, Y., "New Techniques Relating Fault Detection and Exclusion Performance to GPS Primary Means Integrity Requirements", ION GPS-1995, Palm Springs, CA, Sep. 12-15, 1995, pp. 1929-1939.

Brown, R. G., "A Baseline GPS RAIM Scheme and a Note on the Equivalence of Three RAIM Methods," *NAVIGATION, Journal of the Institute of Navigation*, vol. 39, No. 3, Fall 1992, pp. 301-316.

Van Diggelen, F., Brown, A., "Mathematical Aspects of GPS RAIM", *Proceedings of 1994 IEEE Position Location and Navigation Symposium*, Atlanta, Mar. 1994, pp. 733-738.

Enge, P. K., et al., "Combining Pseudoranges from GPS and Loran-C for Air Navigation", *NAVIGATION, Journal of the Institute of Navigation*, vol. 37, No. 1, Spring 1990, pp. 281-298.

Horn, R. A., Johnson, C. R., *Matrix Analysis*, Cambridge University Press, 1985, p. 421. "Minimum Operation Performance Standard for Global Positioning System/Wide Area Augmentation System Airborne Equipment", Appendix R, RTCA/DO-229C.

Beyer, W. H., "Handbook of Tables for Probability and Statistics", The Chemical Rubber Company, Cleveland, Ohio, 1966, pp. 146-148.

* cited by examiner

METHOD AND SYSTEM FOR FAULT DETECTION AND EXCLUSION FOR MULTI-SENSOR NAVIGATION SYSTEMS

FIELD OF THE INVENTION

The present invention generally relates to aviation electronics, and more particularly relates to multi-sensor navigation systems, and even more particularly relates to methods and systems for fault detection and fault exclusion in multi-sensor navigation systems.

BACKGROUND OF THE INVENTION

In the past, multi-sensor navigation systems have been used with much success. These multi-sensors typically use global positioning system (GPS) receivers in combination with other inertial sensors to generate position information. However, due to the inadequate signal-in-space integrity currently provided by GPS for civil aviation, it is generally necessary to also employ real-time fault detection and exclusion (FDE) schemes, especially when the multi-sensor system is used for primary means of navigation. Since the current assumptions about the GPS constellation and its measurement accuracy often do not provide high enough availability of FDE to meet the primary means objectives for all phases of flight, integration of GPS with inertial sensors for integrity monitoring has received considerable attention. See Brenner, M., "Integrated GPS/Inertial Fault Detection Availability", ION GPS-95, Palm Springs, Calif., Sep. 2–15, 1995, pp. 1949–1958, hereafter referred to as "Ref [1]." Also see Vanderwerf, K., "FDE Using Multiple Integrated GPS/Inertial Kalman Filters in the Presence of Temporally and Spatially Correlated Ionospheric Errors", ION GPS-2001, Salt Lake City, Utah, Sep. 11–14, 2001, pp. 2676–2685, hereafter referred to as "Ref [2]". Also see Diesel, J., Luu, S., "GPS/IRS AIME: Calculation of Thresholds and Protection Radius Using Chi-Square Methods", ION GPS-95, Palm Springs, Calif., Sep. 12–15, 1995, pp. 1959–1964, hereafter referred to as "Ref [3]." Prior art GPS integrity algorithms can be classified into two broad categories based on the method employed for computing the navigational solution—snapshot approaches and filtered approaches. Snapshot approaches are generally based on least-squares (LS) methods, while filtered approaches generally utilize multiple Kalman filters with different fault hypothesis models.

In addition to the snapshot vs. filtered classification, the prior art GPS integrity algorithms can also be classified into two different categories based on the characteristics of their test statistics for the FDE function—range domain methods vs. position domain methods. For example, the solution separation algorithms described in Refs. [1], [2], and in Brumback, B. D., Srinath, M. D., "A Chi-Square Test for Fault Detection in Kalman Filters", *IEEE Transactions on Automatic Control*, Vol. AC-32, No. 6, June, 1987, pp. 552–554, hereafter referred to as "Ref. [4]" are position domain methods, and the measurement residual algorithm in Ref. [3] is a range domain method.

The prior art multi-sensor systems and FDE algorithms have several common characteristics and requirements. The FDE function is typically required to ensure the integrity of the navigation solution and prevent the use of hazardous and misleading information. The prior art FDE function typically consists of two distinct parts—fault detection and fault exclusion. The purpose of prior art fault detection has been to detect the presence of an unacceptable error, and the purpose of the typical prior art fault exclusion has been to identify and exclude the culprit causing the unacceptable error with high confidence. The FDE function is also often required to provide a statistical bound, horizontal protection level (HPL), which the FDE function often guarantees that the horizontal position error can only exceed it prior to fault detection within the specified probability of missed detection ($P_{MD}$).

After a fault is detected in prior art systems, the HPL is often operationally of little value because HPL no longer bounds the true error at the specified statistical level. The horizontal uncertainty level (HUL) can provide a bound on the horizontal position error after fault detection and before the correct fault exclusion can be performed. Thus, it typically enables the pilots or airborne equipment to determine whether the navigation solution is still acceptable at a given phase of flight. The operational differences between HPL and HUL are discussed in Young, R. S. Y., McGraw, G. A., Driscoll, B. T., "Investigation and Comparison of Horizontal Protection Level and Horizontal Uncertainty Level in FDE Algorithms", ION GPS-96, Kansas City, Mo., Sep. 17–20, 1996, pp. 1607–1614, hereafter referred to as "Ref. [5]."

While these prior art multi-sensor systems and FDE algorithms have enjoyed success in the past, they have some drawbacks in certain circumstances. Often these systems fail to provide a sufficiently precise probability level for the detection threshold and HPL. Additionally, in some prior art systems, it is necessary to make real GPS measurements to achieve a requisite level of predictability.

Consequently, there exists a need for improvement in the FDE algorithms for multi-sensor navigation systems.

SUMMARY OF THE INVENTION

It is an object of the present invention to provide a multi-sensor GPS navigation system which provides data which is sufficient to serve as a primary navigation source for commercial air transport aircraft.

It is a feature of the present invention to utilize a fault detection algorithm which is based on normalized solution separation which uses a normalized approach to determine statistical properties of a test statistic.

It is an advantage of the present invention to provide enhanced ability to obtain sufficient probability levels for the detection threshold and HPL.

It is another advantage of the present invention to predict HPL without the need for making real GPS measurements.

It is another object of the present invention to provide a tightly integrated GPS/inertial sensor system which can be used for the primary means of navigation from oceanic/remote down to non-precision approach phases of flight.

It is another feature of the present invention to employ a hybrid algorithm which combines two independent and parallel methods for fault detection and fault exclusion.

It is an advantage of the present invention to provide for speedier determination of fault exclusions in some circumstances.

It is another feature of the present invention to provide an indication of HUL for a combined GPS/inertial navigation system.

It is another advantage to provide additional valuable information to the pilot.

It is yet another feature of the present invention to provide for parallel independent processing schemes for fault exclusion, which schemes include a post update residual monitoring scheme, together with a well-known least squares scheme.

It is yet another advantage of the present invention to eliminate the need for making at least six GPS measurements to exclude a fault in circumstances having medium to fast failure rates.

The present invention is a system, method and apparatus designed to achieve the above-mentioned objects, include the earlier-listed features and provide the already articulated advantages.

Accordingly, the present invention is a combined GPS/inertial sensor system which uses independent fault detection and fault exclusion schemes, as well as improved methods for fault detection by determining B(k) (the covariance of solution separation vector) in a more efficient way and a post-update residual monitoring scheme for fault exclusion.

DETAILED DESCRIPTION

Figure 1:
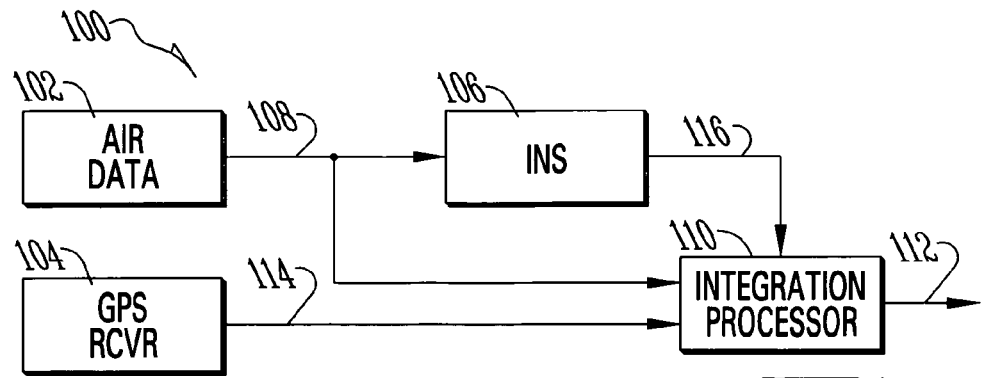
FIG. 1 is a block diagram of the GPS/INS integration architecture of the present invention.

Now referring to the Figures, where like numerals refer to like matter and text throughout, and more particularly referring to FIG. 1, generally designated 100, there is shown a block diagram of the GPS/INS integration architecture of the present invention. This is an open loop integration such that there is no feedback to the INS 106 or the GPS receiver 104 from the integration processor 110. Air data 102 is shown to be provided to both the INS 106 and the integration processor 110 which outputs a corrected position 112, as well as other data including HPL, HUL, shown in FIG. 2. The proposed Kalman filter is executed in the integration processor 110. Also in FIG. 1, 108 represents an altitude line; 114 represents a pseudoranges and SV ECEF positions line; and 116 represents a position, velocity and attitude line.

Figure 2:
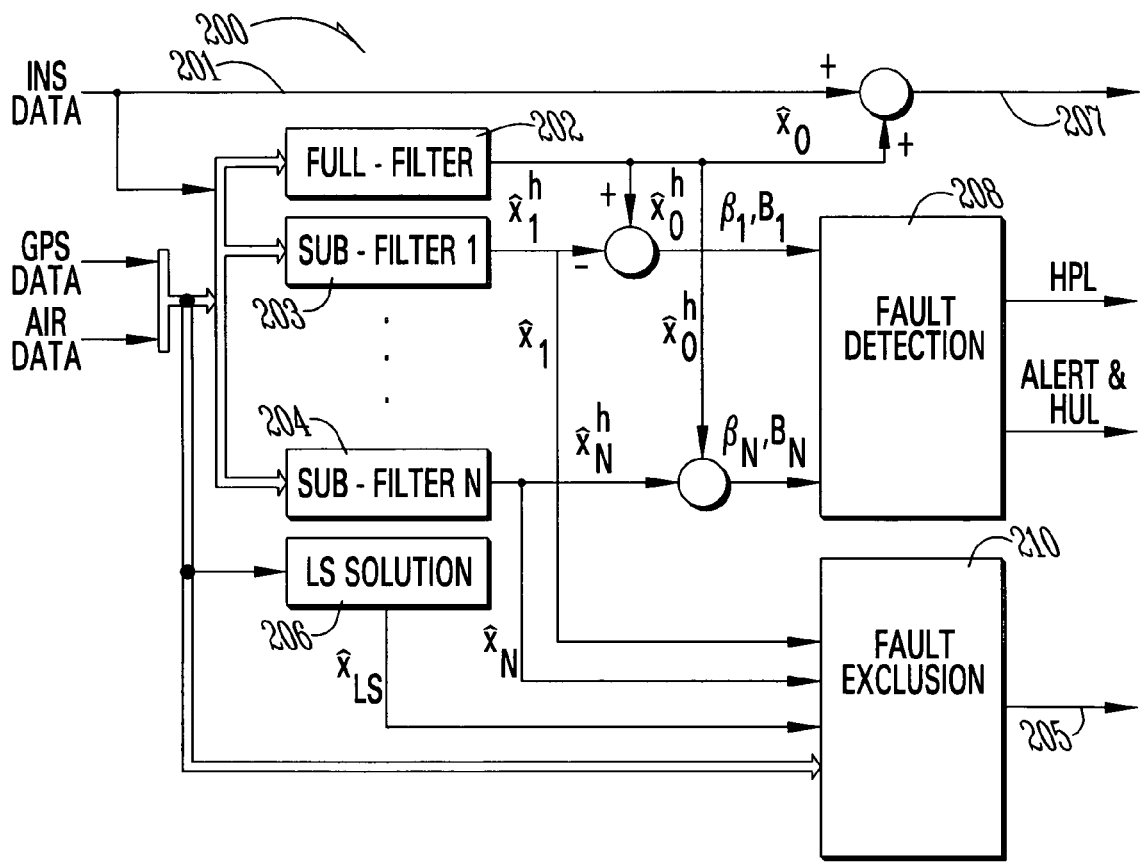
FIG. 2 is the processing diagram of the FDE algorithm for the integration architecture of FIG. 1.

Now referring to FIG. 2, there is shown the architecture, generally designated 200, of the integration processor 110. There are multiple navigation solutions for the filtered FDE algorithm. The filtered FDE algorithm uses one Full-Filter 202, multiple Sub-Filters 203 and 204 and one least-squares navigation method 206. The Full-Filter 202 and the least-squares method 206 process all available measurements, while the Sub-Filters 203–204 each excludes one of available measurements. The fault detection function 208 uses information from the Full-Filter 202 and all Sub-Filters 203–204. The fault exclusion function 210 uses information from available measurements, the least-squares method 206, and all Sub-Filters 203–204. Note: $\hat{x}^h$ is the estimated horizontal position error vector. Also in FIG. 2, 201 represents an INS position line; 205 represents a re-initialization line; and 207 represents a corrected position line.

The present invention can be better understood by first understanding and then contrasting it with the prior art GPS integrity algorithms, where test statistics for both the fault detection function and the fault exclusion function are in the same domain; i.e., both in the position domain or both in the range domain. In such prior art systems, the processing of the fault exclusion function is usually started after a fault is detected by the fault detection function.

In contrast, for the FDE algorithm of the present invention, the test statistics for the fault detection function 208 and the fault exclusion function 210 are in different domains; i.e., the former is in the position domain, and the latter is in the range domain. Therefore, for some failure types, the test statistic for the fault exclusion function 210 may detect the presence of the failure earlier than that for the fault detection function 208. To take advantage of this characteristic and achieve better FDE performance, it is proposed to treat the fault detection function 208 and the fault exclusion function 210 as two independent processes that run in parallel.

Kalman Filter Structure

The simulation results presented herein are based on design with 31 Kalman error states for each filter. The states are as follows:

$\delta\hat{x}_{0-1}$: Angular position errors
$\delta\hat{x}_2$: Altitude error
$\delta\hat{x}_{3-5}$: Velocity errors
$\delta\hat{x}_{6-8}$: Attitude and heading errors
$\delta\hat{x}_{9-11}$: GPS receiver clock bias, clock frequency error and clock frequency rate error
$\delta\hat{x}_{12}$: Baro altitude bias
$\delta\hat{x}_{13-15}$: Accelerometer biases
$\delta\hat{x}_{16-18}$: Gyro biases
$\delta\hat{x}_{19-30}$: GPS pseudorange biases The first 9 error states are referenced to the local navigation frame. The accelerometer and gyro biases are referenced to the body frame. The GPS pseudorange biases are along the Line-Of-Sight (LOS) of each satellite in view. The accelerometer and gyro biases are each modeled as a first-order Markov process. The GPS pseudorange with Selective Availability absent is also modeled as a first-order Markov process. The pseudorange measurement noise was modeled as a zero mean, Gaussian white sequence. To balance between the computational burden and navigational accuracy, the measurement update period $T_B$ for all Kalman filters was chosen to be greater than one second.

FAULT DETECTION PROCESSING

The normalized solution separation algorithm for the fault detection function was adapted from the chi-square test developed by Brumback and Srinath in Ref. [4]. The assumptions, processing, and essential properties of the algorithm are discussed below.

System and Filter Models

Assume the following discrete state space model for the true system error state x(k) and the measurement z(k) for the Full-Filter.

$x(k)=\Phi(k,k-1)x(k-1)+\omega(k)$ $z(k)=H_0(k)x(k)+\upsilon_0(k)+b(k)u(k,k_0)$ \hfill (1)

where x(k) is a 1×1 vector and z(k) is a n×1 vector. $\omega(k)$ and $\upsilon_0(k)$ are independent, zero means, Gaussian white sequences having covariance of Q(k) and $R_0(k)$, respectively (the subscript "0" denotes parameters associated with the Full-Filter). The initial state x(0) is a Gaussian random vector independent of $\omega(k)$ and $\upsilon_0(k)$ and has mean $x_0$ and covariance $\bar{P}_0$. The n×1 b(k) vector models the failed event, i.e., b(k)=b(k)$e_j$. u(k,$k_0$) is the unit step function at $k_0$, i.e., u≡1 for k≧$k_0$, where $k_0$ is the time at which the failure occurs.

When the jth measurement is excluded, the measurement vector in Eq. (1) is modified as $$z_j(k)=E_j z(k) \quad (2)$$

where $E_j=I_n-e_j e_j^T$ and $e_j\equiv[0, \ldots, 0, 1, 0, \ldots, 0]^T$, which is the jth unit standard basis in $R^n$.

The initial condition and covariance for both Full-Filter and jth Sub-Filter are $$\hat{x}_0(0/0)=\hat{x}_j(0/0)=E\{x(0)\}=x_0 \quad (3)$$

$$P_0(0/0)=P_j(0/0)=\bar{P}_0 \quad (4)$$

Since the jth Sub-Filter uses one less measurement than the Full-Filter, there is one pseudorange bias error state used by the Full-Filter, but not by the jth Sub-Filter. However, with Eq. (3), this unused pseudorange bias error state in the jth Sub-Filter is initialized to be equal to the Full Filter's counterpart. It can be shown that this approach has no effect on the performance of the jth Sub-Filter since this SV is not used. However, for real-time software, this unused bias state can be dropped for the jth Sub-Filter to save computational time.

Define the estimation errors, $\tilde{x}_0^h$ and $\tilde{x}_j^h$, as:

$$\tilde{x}_0^h(k)=\hat{x}_0^h(k/k)-x^h(k) \quad (5)$$

$$\tilde{x}_j^h(k)=\hat{x}_j^h(k/k)-x^h(k) \quad (6)$$

where $\hat{x}_0^h$ is the horizontal position error estimate (a 2×1 vector) from the Full-Filter, $\hat{x}_j^h$ is the horizontal position error estimate (a 2×1 vector) from the jth Sub-Filter and $x^h$ is the true horizontal position error.

Derivation of Normalized Solution Separation Test Statistics

The solution separation vector between the Full-Filter and the jth Sub-Filter is defined as $$\beta_j(k)=\tilde{x}_0^h(k)-\tilde{x}_j^h(k)=\hat{x}_0^h(k/k)-\hat{x}_j^h(k/k) \quad (7)$$

Prior to the onset of the failure, i.e., k<$k_0$, $E\{\beta_j(k)\}$=0 since each filter is linear and each estimate is unbiased. The covariance of the solution separation vector is $$B_j(k)=P_0^h(k/k)-P_{0j}^h(k/k)-P_{j0}^h(k/k)+P_j^h(k/k) \quad (8)$$

where $$P_0^h(k/k)=E\{\tilde{x}_0^h(\tilde{x}_0^h)^T\}$$

$$P_j^h(k/k)=E\{\tilde{x}_j^h(\tilde{x}_j^h)^T\}$$

$$P_{j0}^h(k/k)=E\{\tilde{x}_j^h(\tilde{x}_0^h)^T\}=(P_{0j}^h(k/k))^T \quad (9)$$

However, it is shown in a dedicated section below that in fact $P_{0j}^h(k/k)=P_0^h(k/k)$. Therefore, $$B_j(k)=P_j^h(k/k)-P_0^h(k/k) \quad (10)$$

This simplification yields considerable computational savings as compared to the dual covariance propagator presented in Refs. [1] and [2].

The normalized solution separation test statistic is given by $$\lambda_j(k)=\beta_j^T(k)B_j^{\#}(k)\beta_j(k) \quad (11)$$

where $B_j^{\#}$ denotes the Moore-Penrose generalized inverse, as discussed in Horn, R. A., Johnson, C. R., *Matrix Analysis*, Cambridge University Press, 1985, hereafter referred to as Ref [6] of $B_j$ and $\lambda_j(k)$ is chi-square distributed. A fault is declared if $\lambda_j^{1/2}(k)\geq TD_2$ for any j, where $TD_2$ is the detection threshold. To be consistent with the detection criterion used in Brown, R. G., Chin, G. Y., "GPS RAIM Calculation of Thresholds and Protection Radius Using Chi-Square Methods—A Geometric Approach", *Red Book Series, Vol. V, of the Institute of Navigation on Global Positioning System*, The Institute of Navigation, Alexandria, Va., 1998, pp. 155–178, hereafter referred to as Ref [7], $\lambda_j^{1/2}(k)$ instead of $\lambda_j(k)$ is chosen as the test statistic in this paper. Since the relationship between $\lambda_j^{1/2}(k)$ and $\lambda_j(k)$ is monotonic, the fault detection algorithm can be developed based on the chi-square statistics and the appropriate conversion is used to obtain the corresponding result for $\lambda_j^{1/2}(k)$. The determination of the $TD_2$ will be discussed below.

Normalized Solution Separation Detection Threshold: Full-Rank Case

In this case, the Moore-Penrose inverse in Eq. (11) becomes a regular matrix inverse. However, for reasons of numerical stability in on-line computations and consistency with the general case of $B_j(k)$ being rank deficient, the computation in Eq. (11) is implemented as follows:

Denote the eigenvalue decomposition of $B_j(k)$ as $$B_j(k)=V_j(k)S_j(k)V_j^T(k) \quad (12)$$

with $$S_j(k) = \begin{bmatrix} \sigma_{1,Bj}(k) & 0 \\ 0 & \sigma_{2,Bj}(k) \end{bmatrix} \quad (13)$$

$$V_j(k)=[v_1(k)\ v_2(k)] \quad (14)$$

where $v_1(k)$ and $v_2(k)$ are the eigenvectors of $B_j(k)$ and $\sigma_{1,Bj}\geq\sigma_{2,Bj}$. The normalized solution separation vector is given by $$y_j(k)=S_j^{-1/2}(k)V_j^T(k)\beta_j(k) \quad (15)$$

with $$S_j^{-1/2}(k) = \begin{bmatrix} \sigma_{1,Bj}^{-1/2}(k) & 0 \\ 0 & \sigma_{2,Bj}^{-1/2}(k) \end{bmatrix} \quad (16)$$

and the detection statistic becomes $$\lambda_j(k)=y_j^T(k)y_j(k) \quad (17)$$

In the full-rank case, $\lambda_j(k)$ is chi-square distributed with two degrees of freedom and the selection of $TD_2$ to meet the required false alarm probability is straightforward. Because there are multiple filters and any of the filters can cause a false alert, $TD_2$ needs to be determined from $P_{FA}/N$, where $P_{FA}$ is the specified false alert rate and N is the number of available measurements.

Prior solution separation FDE approaches in the literature (e.g., Refs [1] and [2]) have used the unnormalized test statistic $\|\beta_j(k)\|$ along with a one-dimensional Gaussian statistics and standard deviation of $\sigma_{1,Bj}$ to compute the detection threshold and HPL. Since $\|\beta_j(k)\|$ is not a Gaussian variable, the use of the 1-DOF Gaussian statistics in determining the detection threshold and HPL may result in an underestimate of the actual error.

Normalized Solution Separation Detection Threshold: Rank-Deficient Cas

When $B_j(k)$ is either rank-1 or ill-conditioned, the inverse of $S_j(k)$ does not exist or its computation will lead to numerical difficulties. This numerical stability issue could be resolved if the detection statistic is treated as 1-DOF Gaussian distributed (i.e., ignore error contribution along the $v_2(k)$ direction) by computing $S_j^{-1/2}(k)$ through the Moore-Penrose generalized inverse:

$$S_j^{-1/2}(k) = \begin{bmatrix} \sigma_{1,Bj}^{-1/2}(k) & 0 \\ 0 & 0 \end{bmatrix} \quad (18)$$

However, this approach compromises false alert and missed alert probabilities for the ill-conditioned case. This is because, unlike the least-squares case where both the solution bias and noise lie only in the $v_1(k)$ subspace, in the filtered case there are noise and parts of the solution separation bias that are along the $v_2(k)$ direction, which would not be accounted for if the detection statistic is treated as 1-DOF Gaussian distributed. Therefore, it is proposed to modify Eq. (16) and detection threshold as follows to both preserve numerical stability and provide better false alert and missed alert protection than just using 1-DOF Gaussian approximation.

In the ill-conditioned or rank-1 case, it is proposed to use $$S_j^{-1/2}(k) \equiv \begin{bmatrix} \sigma_{1,Bj}^{-1/2}(k) & 0 \\ 0 & \sigma_{1,Bj}^{-1/2}(k) \end{bmatrix} \quad (19)$$

A fault is declared if $$\lambda_j^{1/2}(k) \geq (1+\sigma_{2,Bj}(k)/\sigma_{1,Bj}(k))^{1/2} TD_1, \text{ for any } j \quad (20)$$

where $TD_1$ is determined from 1-DOF Gaussian statistics to meet the probability of false alarm $P_{FA}/N$. When $B_j(k)$ is a rank-1 matrix, there is no noise in the $v_2(k)$ subspace. Therefore, assigning the second diagonal term in Eq. (19) as $\sigma_{1,Bj}^{-1/2}(k)$ does not introduce additional noise on $\lambda_j(k)$. In addition, Eq. (20) provides the exact false alert probability. When $B_j(k)$ is rank-1 or ill-conditioned, the second diagonal term in Eq. (19) enables the component of the solution separation bias vector along the $v_2(k)$ direction to be properly scaled in $\lambda_j(k)$ so it can be accounted for in the computation of the estimated horizontal position error later through the multiplication of $\lambda_{1,Bj}^{1/2}(k)$ in Eq. (34). Therefore, with Eq. (19), the exact magnitude of the solution separation bias vector is captured in $\lambda_j(k)$ and accounted for in the estimated horizontal position error, which the 1-DOF approximation does not since it ignores any error contribution along the $v_2(k)$ direction. When $B_j(k)$ is ill-conditioned, with $TD_1$ scaled as in Eq. (20), a portion of the noise in the $v_2(k)$ direction is accounted for, which the 1-DOF approximation does not.

HORIZONTAL PROTECTION LEVEL

If the horizontal position error exceeds the HPL, it can be due to a measurement fault incorporated into the navigational solution or the rare normal fault-free event. See "Minimum Operation Performance Standard for Global Positioning System/Wide Area Augmentation System Airborne Equipment", Appendix R, RTCA/DO-229C, hereafter referred to as Ref. [8]. Therefore, HPL is determined as follows:

$$HPL = \max\{HPL_{H0}, HPL_{H1}\} \quad (21)$$

where $HPL_{H0}$ is based on the rare normal fault-free hypothesis and $HPL_{H1}$ is based on the fault-in-progress hypothesis. The algorithms for $HPL_{H1}$ and $HPL_{H0}$ are derived below.

HPL Based on the Fault-In-Progress Hypothesis ($HPL_{H1}$)

The estimated horizontal position error vector from the Full-Filter at the fault detection can be expressed as follows:

$$\hat{x}_0^h(k_{TD}) = x^h(k_{TD}) + \text{bias}_0(k_{TD}) + \omega_0(k_{TD}) \quad (22)$$

where $k_{TD}$ is the time at fault detection, $\omega_0(k_{TD})$ is the noise vector with zero mean from the Full-Filter and $\text{bias}_0(k_{TD})$ is the horizontal position bias vector of the Full-Filter.

Since the solution from the Full-Filter is output for use by external airborne equipment, the true horizontal position error vector is defined as follows:

$$Err(k_{TD}) = \hat{x}_0^h(k_{TD}) - x^h(k_{TD}) = \text{bias}_0(k_{TD}) + \omega_0(k_{TD}) \quad (23)$$

$Err(k_{TD})$ cannot be computed directly because both $\text{bias}_0(k_{TD})$ and $\omega_0(k_{TD})$ are unknown. Therefore, we need to estimate $Err(k_{TD})$ based on some parameter that can be computed directly, namely the solution separation vector, $\beta_j$, in Eq. (7).

Before proceeding to the $HPL_{H1}$ algorithm, we introduce the following notation to facilitate the mathematical derivation.

$R(\omega, P_{MD})$ is the radius such that $Prob\{\|\omega\| > R(\omega, P_{MD})\} = P_{MD}$ (24)

$R(\omega, m, P_{MD})$ is the distance such that $Prob\{\|m + \omega\| > \|m\| + R(\omega, m, P_{MD})\} = P_{MD}$ (25)

Note that $R(\omega, 0.5)$ is the standard circular error probability for a two-dimensional random variable $\omega$. When $\|m\| = 0$, $R(\omega, P_{MD}) = R(\omega, m, P_{MD})$.

Figure 3:
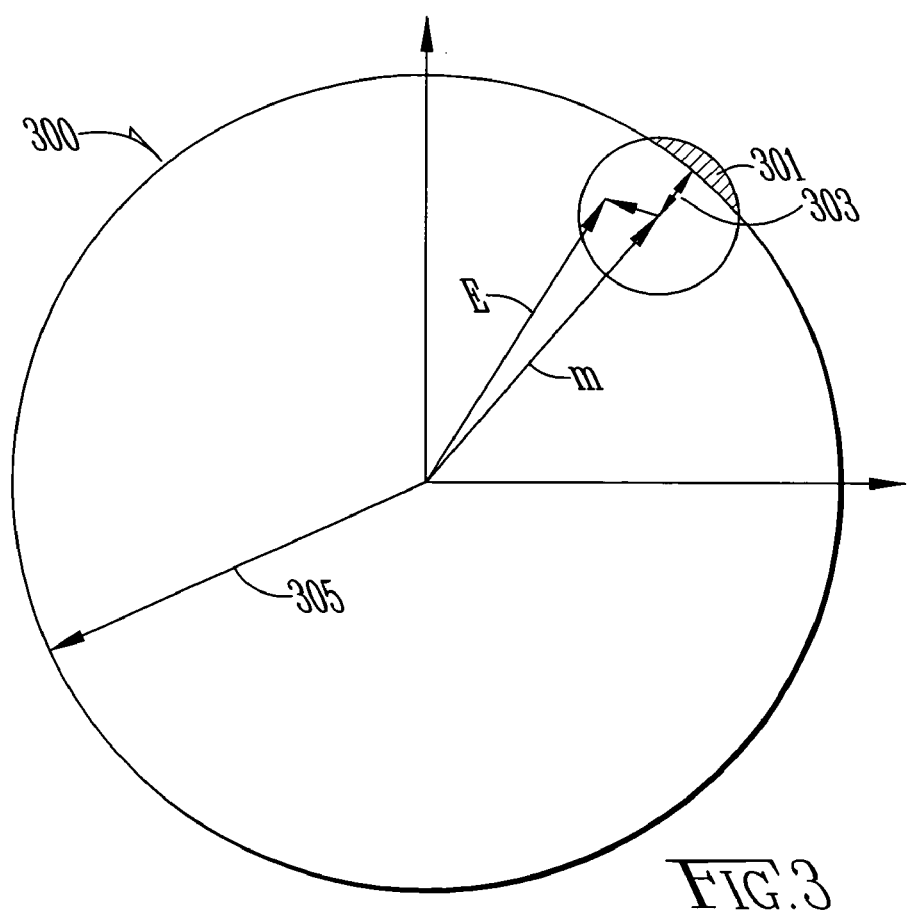
FIG. 3 is a conceptual illustration of Eq. (25) for $\|m\| >> 0$.

Now referring to FIG. 3, generally designated 300, 301 represents a portion of a noise cloud with $P_{MD}$ probability; 303 represents $R(\omega, m, P_{MD})$; and 305 represents a $(1-P_{MD})$ error bound of E. Also in FIG. 3, an illustration of Eq. (25) for $\|m\| >> 0$ is shown. With Eqs. (23) and (25), the ideal horizontal position error bound, $\alpha$, can be written as $$\alpha = \|\text{bias}_0(k_{TD})\| + R(\omega_0(k_{TD}), \text{bias}_0(k_{TD}), P_{MD}) \quad (26)$$

Since $\text{bias}_0(k_{TD})$ is unknown, the solution separation vector $\beta_j$ is used to estimate it with $(1-P_{MD})$ probability. At the fault detection, the solution separation vector for the jth Sub-Filter not using the failed measurement can be written as $$\beta_j = \hat{x}_0^h - \hat{x}_j^h = \text{bias}_0 + \omega_0 - \omega_j = \text{bias}_0 - \omega'_j \quad (27)$$

where $\omega_j$ is the noise vector from the jth Sub-Filter and $\omega'_j$ is the component of $\omega_j$ independent of $\omega_0$ (Note: the index $k_{TD}$ is suppressed here and below for notational convenience).

As shown in Eq. (27), using $\beta_j$ to estimate $bias_0$ introduces an additional noise term $\omega'_j$ that does not exist in Eq. (26). To properly account for the effect of this additional noise term, Eq. (26) is re-arranged as $$\alpha = \|bias_0\| + R(\omega'_j, bias_0, P_{MD}) + R(\omega_0, bias_0, P_{MD}) - R(\omega'_j, bias_0, P_{MD}) \quad (28)$$

Based on Eq. (28), the algorithm for the ideal horizontal position error bound $\alpha$ is divided into two parts. The first part is to estimate the first two terms at the right hand side of Eq. (28) due to $bias_0$ and uncorrelated noise $\omega'_j$ with $\beta_j$. The second part is to estimate the last two terms at the right hand side of Eq. (28) due to the noise $\omega_0$ and $\omega'_j$.

Horizontal Position Error Due to Bias and Uncorrelated Noise

The mean of the normalized solution separation vector and the test statistic can be written as:

$$\bar{y}_j = E\{y_j\} = S_j^{-1/2} V_j^T bias_0 \quad (29)$$

$$\lambda_j = y_j^T y_j = (\tilde{y}_j(1) + m_{j1})^2 + (\tilde{y}_j(2) + m_{j2})^2 \quad (30)$$

where the noise components, $\tilde{y}_j(1)$ and $\tilde{y}_j(2)$, are independent with $N(0, 1)$ and the means for $y_j(1)$ and $y_j(2)$ are $m_{j1}$ and $m_{j2}$, respectively.

With an orthonormal rotation, $\lambda_j$ can be shown to be noncentral chi-square distributed. Therefore, we can compute the noncentrality parameter that makes the noise inside the detection threshold to be $P_{MD}$. With normalization, this noncentrality parameter is the "Pbias" in parity space FDE algorithms Ref. [7].

Figure 4:
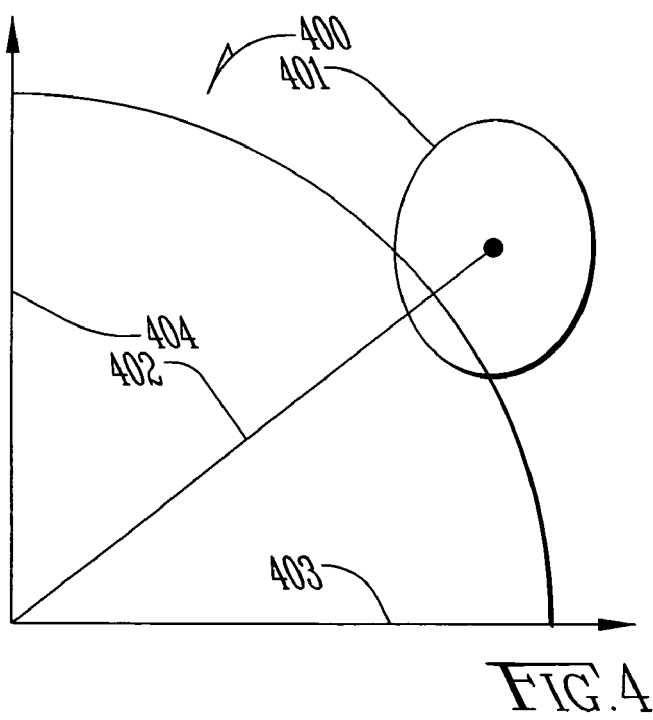
FIG. 4 is a conceptual illustration of Pbias for the 2-DOF case.

Now referring to FIG. 4, generally designated 400, 401 represents a noise cloud with $P_{MD}$ inside detection threshold; 402 represents Pbias; and 403 represents a normalized solution separation (y) domain line. There is shown an illustration of Pbias for the 2-DOF case. So, for any bias vector with a magnitude greater than Pbias, it will be detected with $(1-P_{MD})$ probability. 404 represents the detection threshold.

The relationship between Pbias and its corresponding bias vector, $\gamma_{Pbias}$, in the horizontal position domain can be defined as:

$$\bar{Y}_j = S_j^{-1/2} V_j^T \gamma_{Pbias} \quad (31)$$

$$Pbias = \sqrt{\bar{Y}_j^T \bar{Y}_j} \quad (32)$$

After determining the Pbias in the normalized solution separation (y) domain, we need to convert it back to determine $\|\gamma_{Pbias}\|$ since our main interest is the horizontal position error. $\|\gamma_{Pbias}\|$ can be computed as $$\|\gamma_{Pbias}\| = \sqrt{\bar{Y}_j^T S_j \bar{Y}_j} \quad (33)$$

To compute Eq. (33), we need to know the $\bar{Y}_j$ vector defined in Eq. (31). Since the exact orientation of the $\gamma_{Pbias}$ vector is unknown, we cannot determine $\bar{Y}_j$. Nonetheless, we can compute the upper bound of Eq. (33) as follows:

$$\sqrt{\bar{Y}_j^T \begin{bmatrix} \sigma_{1,Bj} & 0 \\ 0 & \sigma_{2,Bj} \end{bmatrix} \bar{Y}_j} \le Pbias\sqrt{\sigma_{1,Bj}} = HPE\_B_j \quad (34)$$

where $\sigma_{1,Bj}$ is the largest eigenvalue of the $B_j$ matrix and HPE_B is the horizontal position error bound of $\|\gamma_{Pbias}\|$ with a specified probability of missed detection ($P_{MD}$).

Since the worst case assumption is used in Eq. (34) and $\beta_j = bias_0 - \omega'_j$, it can be shown $$HPE\_B_j \ge \|bias_0\| + R(\omega'_j, bias_0, P_{MD}) \quad (35)$$

Horizontal Position Error Due to Noise Only

The last two terms at the right hand side of Eq. (28) can be related to the radii determined with the circular error probability calculation as $$R(\omega_0, bias_0, P_{MD}) = R(\omega_0, P_{MD}) - \epsilon_1 \quad (36)$$

$$R(\omega'_j, bias_0, P_{MD}) = R(\omega'_j, P_{MD}) - \epsilon_2 \quad (37)$$

It can be shown that $\epsilon_1 \ge 0$ and $\epsilon_2 \ge 0$.

Now, by substituting Eqs. (35)–(37) into Eq. (28), Eq. (28) can be re-written as $$\alpha \le HPE\_B_j + R(\omega_0, P_{MD}) - R(\omega'_j, P_{MD}) + \epsilon_2 - \epsilon_1 \quad (38)$$

$R(\omega_0, P_{MD})$ in Eq. (38) can be decomposed as $$R(\omega_0, P_{MD}) = R(\omega_j, P_{MD}) - \epsilon_3 \quad (39)$$

Since $\omega_j = \omega_0 + \omega'_j$, $\epsilon_3 \ge 0$. With Eq. (39), Eq. (38) can be re-arranged as $$\alpha \le HPE\_B_j + R(\omega_j, P_{MD}) - R(\omega'_j, P_{MD}) + \epsilon_2 - \epsilon_1 - \epsilon_3 \quad (40)$$

Now, let us examine the error term, $\epsilon_2 - \epsilon_1 - \epsilon_3$, in Eq. (40). For the limiting case $E\{\omega'_j(\omega'_j)^T\} = 0$, $\epsilon_2 = 0$, $\epsilon_3 = 0$, and $\epsilon_1 \ge 0$. Therefore, for the limiting case, $\alpha$ will be bounded by $$\alpha \le HPE\_B_j + R(\omega_j, P_{MD}) - R(\omega'_j, P_{MD}) \quad (41)$$

It has been found by simulation that Eq. (41) appears to be always valid. Therefore, Eq. (41) provides the required statistical bound for horizontal position errors.

The last two terms in Eq. (41) can be computed through their respective noise covariance $P_j$ and $B_j$ by the following two steps.

(1) The noise on the X and Y axes in the horizontal navigational coordinates are likely to be correlated, i.e., the covariance has non-zero off-diagonal terms. Therefore, a coordinate transformation should be used to transform the X-Y plane to a principal X1-Y1 plane such that noise components in X1 and Y1 axes are not correlated.

(2) After the coordinate transformation, the noise components in X1 and Y1 axes are independent Gaussian noise with, in general, unequal standard deviations. The upper bound of the horizontal position error for a specified probability can be computed by using circular error probability (CEP) table look-up, Beyer, W. H., "Handbook of Tables for Probability and Statistics", The Chemical Rubber Company, Cleveland, Ohio, 1966, pp. 146–148 hereafter referred to as Ref. [9] or a polynomial approximation. For our applications, a CEP table look-up suffices since a constant $P_{MD}$ is required.

Following the above two steps, $R(\omega_j, P_{MD})$ can be computed as $$HPE\_NP_j = R(\omega_j, P_{MD}) = K_{cep,j}\sqrt{\sigma_{1,j}} \quad (42)$$

where $\sigma_{1,j}$ and $\sigma_{2,j}$ are the eigenvalues of $P_j$, $\sigma_{1,j} \ge \sigma_{2,j}$, and $K_{cep,j}$ is a function of $(1-P_{MD})$ probability and $(\sigma_{1,j}/\sigma_{2,j})^{1/2}$ in the CEP look-up table.

$R(\omega'_j, P_{MD})$ is computed as $$HPE\_NB_j = R(\omega'_j, P_{MD}) = K_{cep,Bj}\sqrt{\sigma_{1,Bj}} \quad (43)$$

where $\sigma_{1,Bj}$ and $\sigma_{2,Bj}$ are the eigenvalues of $B_j$, $\sigma_{1,Bj} \ge \sigma_{2,Bj}$, and $K_{cep,Bj}$ is a function of $(1-P_{MD})$ probability and $(\sigma_{1,Bj}/\sigma_{2,Bj})^{1/2}$ in the CEP look-up table.

The total estimated horizontal position error for the jth Sub-Filter is computed as $$HPE_j = HPE\_B_j + HPE\_NP_j - HPE\_NB_j \quad (44)$$

Since there are multiple Sub-Filters, $HPL_{H1}$ is determined as follows:

$$HPL_{H1} = \max_{i=1}^{N} HPE_i \quad (45)$$

HPL Based on the Rare Normal Fault-Free Hypothesis

If there is no fault in the navigation solution, the Kalman error covariance from the Full-Filter can be used to determine $HPL_{H0}$ by following steps (1) and (2).

$$HPL_{H0} = K_{ffd}\sqrt{\sigma_{1,0}} \quad (46)$$

where $\sigma_{1,0}$ and $\sigma_{2,0}$ are the eigenvalues of $P_0^h$, $\sigma_{1,0} \geq \sigma_{2,0}$, $K_{ffd}$ is a function of $(1-P_{H0})$ probability and $(\sigma_{1,0}/\sigma_{2,0})^{1/2}$ in the CEP look-up table, and $P_{H0}$ is the fault-free integrity probability.

HORIZONTAL UNCERTAINTY LEVEL

The algorithm for the Horizontal Uncertainty Level is adapted from the algorithm developed for the HPL. Therefore, like the HPL, HUL consists of two components—$HUL_{H0}$ and $HUL_{H1}$. By proceeding with the same argument in developing Eq. (46), it can be shown $HUL_{H0} = HPL_{H0}$.

Horizontal Uncertainty Error Due to Bias and Uncorrelated Noise

Since $\lambda_j(k)$ contains the information about the $bias_0(k)$ vector, it can be used to estimate the portion of the true horizontal position error due to the bias and uncorrelated noise at time k. By proceeding with arguments similar to those used for Eq. (34), the horizontal uncertainty error due to the $bias_0(k)$ vector can be computed for a specified probability as follows:

$$HUE\_B_j(k) = \|bias_0(k)\| \leq \sqrt{\sigma_{1,Bj}(k)}(\sqrt{\lambda_j(k)} + \Delta p_j), \; k \geq k_{TD} \quad (47)$$

where $\Delta p_j$ is intended to compensate for the reduction of $\bar{y}_j(k)$ by noise in the y domain.

Now, the question is how to determine $\Delta p_j$ such that Eq. (47) will bound the current horizontal position error induced by the bias and uncorrelated noise with the $(1-P_{MD})$ confidence. As derived in Eq. (28) of Ref. [5], $\Delta p_j$ can be approximated as follows:

$$\Delta p_j \approx Pbias - Td \quad (48)$$

where Pbias is given in Eq. (32) and Td is the detection threshold used in the fault detection.

So, Eq. (47) can be rearranged as follows:

$$HUE\_B_j(k) \leq \sqrt{\sigma_{1,Bj}(k)}(\sqrt{\lambda_j(k)} + Pbias - Td) \quad (49)$$

Horizontal Uncertainty Error Due to Noise Only

The horizontal position errors due to noise derived in Eqs. (42) and (43) can be used to compensate $HUE\_B_j(k)$.

Therefore, the total estimated horizontal uncertainty error for the jth Sub-Filter can be computed as follows:

$$HUE_j(k) = HUE\_B_j(k) + HPE\_NP_j(k) - HPE\_NB_j(k) \quad (50)$$

Since there are multiple Sub-Filters, the $HUL_{H1}(k)$ is determined as follows:

$$HUL_{H1}(k) = \max_{i=1}^{N} HUE_i(k) \quad (51)$$

Therefore, HUL at time step k is determined as follows:

$$HUL(k) = \max\{HUL_{H0}(k), HUL_{H1}(k)\} \quad (52)$$

FAULT EXCLUSION PROCESSING

In this embodiment of the present invention, measurement residual monitoring is proposed for the fault exclusion function. There are two requirements for fault exclusion.

(I) Fault identification: Identify the failed measurement with the probability of $(1-P_{MI})$, where $P_{MI}$ is the specified probability of misidentification.

(II) Post-exclusion fault detection: If the failed measurement is excluded, the fault detection function based on remaining measurements should be available for the given phase of flight.

Figure 5:
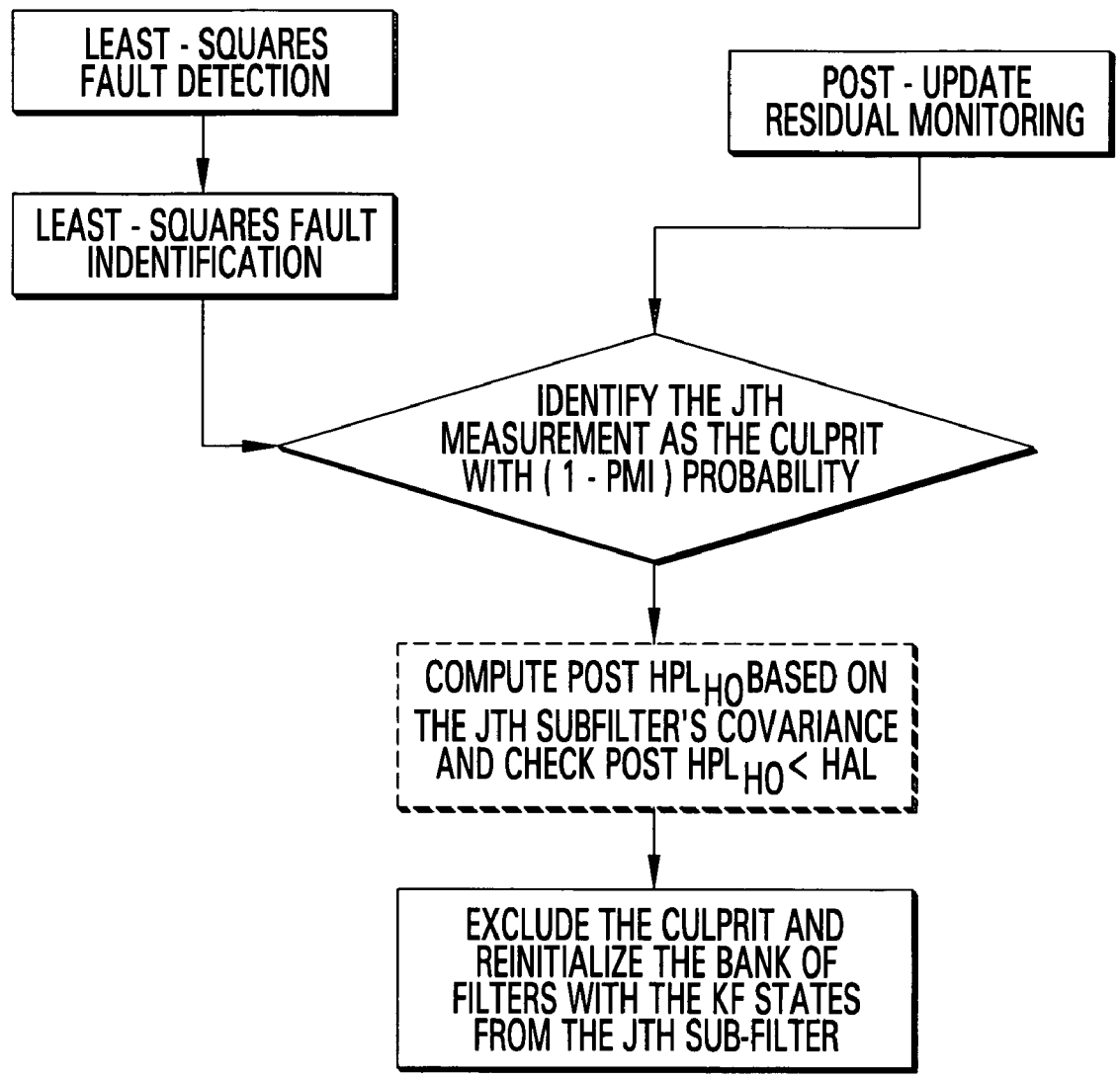
FIG. 5 is a flow diagram of the fault exclusion function where the blocks with bold solid lines are designed to meet the first requirement for fault exclusion, and the block with bold dashed lines is designed to satisfy the second requirement.

Now referring to FIG. 5, the basic processing flow for the proposed fault exclusion function is shown.

The blocks with bold solid lines are designed to meet the first requirement for fault exclusion, and the block with bold dashed lines is designed to satisfy the second requirement. The function of each of these blocks in FIG. 5 will be outlined below.

Fault Identification

As shown in FIG. 5, there are two independent fault identification processes—post-update residual monitoring and least-squares fault detection and identification. The former is primarily designed to isolate medium-to-fast failure rates, and the latter is used to isolate slow failure rates when there are six or more measurements available. Since these two processes are complementary to each other, they are combined here to provide better availability for the fault exclusion function. Either of these two processes can trigger the correct fault isolation and move forward to the next step.

Post-Update Residual Monitoring

The fault isolation algorithm presented in Parkinson, B. W., Axelrad, P., "Autonomous GPS Integrity Monitoring Using the Pseudorange Residual", *NAVIGATION, Journal of the Institute of Navigation*, Vol. 35, No. 2, Summer 1988, pp. 255–274 hereafter referred to as Ref. [10] is adapted below for our applications. The post-update residual vector at time k for each Sub-Filter is computed as follows:

$$\tilde{z}_i(k) = z_i(k) - H_i(k)\hat{x}_i(k/k), \; i=1,\ldots,N \quad (53)$$

where $\tilde{z}_i$ is the post-update residual vector for the ith Sub-Filter and $z_i$ is the linearized measurement vector for the ith Sub-Filter.

For applications related to Kalman filters, the innovation, $\tilde{z}_i^-(k)$, is generally used to exclude abnormal measurements Ref. [3], where $$\tilde{z}_i^-(k) = z_i(k) - H_i(k)\hat{x}_i(k/k-1) \quad (54)$$

However, for the following reasons, the post-update residual vectors are used instead.

The post-update residual is a white sequence and its covariance is smaller than the covariance of the innovation.

Due to the growth of the clock bias uncertainty between Kalman filter updates, the innovation variance can be relatively large. Therefore, it is more difficult to detect the presence of failures with the innovation than with the post-update residual.

The primary advantage of the innovation over the post-update residual is that, for pseudorange step faults with magnitude more than several hundred meters, the fault can be detected and excluded before the failed measurement is incorporated into solutions. For this reason, the step detector function found in most aviation GPS receivers uses innovation to exclude large step errors. However, for ramp failures and smaller step errors, the step detector function will not respond and the FDE function must be relied upon. For these kinds of failures, the FDE function would generally detect the presence of abnormal solutions after failed measurements have been incorporated into solutions. Therefore, there is no real advantage in using innovation over the post-update residual, especially for excluding slow ramp failures.

The post-update residual vector for the jth Sub-Filter not using the failed measurement can be shown to be zero mean and have a covariance, $\Lambda_j(k)$, as given by $$\Lambda_j(k) = R_j(k) - H_j(k) P_j(k/k) H_j^T(k) \tag{55}$$

Now, we define the residual test statistic, $\gamma_j(k)$, for the jth Sub-Filter as $$\gamma_j(k) = \tilde{z}_j^T(k) \Lambda_j^{-1}(k) \tilde{z}_j(k) \tag{56}$$

The direct computation of $\Lambda_j^{-1}(k)$ in Eq. (56) can be avoided by computing the Cholesky decomposition, $$\Lambda_j(k) = L_j(k) L_j^T(k) \tag{57}$$

where $L_j(k)$ is a lower-triangular matrix. The residual test statistic is then computed as $$\zeta_j(k) = L_j^{-1}(k) \tilde{z}_j(k) \tag{58}$$

$$\gamma_j(k) = \zeta_j^T(k) \zeta_j(k) \tag{59}$$

where Eq. (58) is computed via forward substitution.

It can be shown that $\gamma_j(k)$ is central chi-square distributed with (N−1) degrees of freedom since the jth Sub-Filter does not use the failed measurement. It can be further shown that $\gamma_i(k)$ for $i \neq j$ would be noncentral chi-square distributed with (N−1) degrees of freedom because all other Sub-Filters use the failed measurement. This difference in the statistical distribution between $\gamma_j(k)$ and $\gamma_i(k)$ is used as the basis for the fault identification. The required correct fault identification with the probability of $(1-P_{MI})$ for a particular j is $$(\gamma_j)^{1/2} \leq T_I \text{ and } (\gamma_i)^{1/2} > T_E, i \neq j, i=1, \ldots, N \tag{60}$$

where $T_I$ is the isolation threshold and the determination of $(T_I)^2$ is based on the central chi-square statistics with (N−1) degrees of freedom and probability of $(1-P_{MI})$, $T_E$ is the exclusion threshold whose determination is discussed later.

Since the post-update residual vector can be shown to be uncorrelated with previous post-update residual vectors, the performance of the fault identification process can be further improved by averaging the post-update residual vector over several measurement update cycles to reduce noise. However, as mentioned in Ref. [8], the averaging technique would result in the reduction of the detection performance for failures with dynamics that are fast relative to the averaging period. Therefore, to isolate failures due to different failure rates, the post-update residuals are averaged over three different intervals (in terms of update cycles)—1, 10, and 30. So, there are three averaged residual parameters in all for each Sub-Filter.

As shown in FIG. 5, the fault detection function and the fault exclusion function are two independent processes that run in parallel. For fast failure rates, this approach would enable the post-update residual monitoring method to exclude the failed measurement even before a fault is detected in the position domain because the large transient errors induced by fast failure rates would show up earlier in the range domain. However, with the fault detection and the fault exclusion as two independent processes, we need to ensure the fault exclusion processing can meet the same false alarm requirement as the fault detection processing does. Because there are three averaged residual parameters for each Sub-Filter and any of them can cause a false alert, $T_E$ needs to be determined with the false alert probability of $P_{FA}/3$. Therefore, the determination of $(T_E)^2$ is based on the central chi-square statistics with (N−1) degrees of freedom and probability of $(1-P_{FA}/3)$. With $T_I$ and $T_E$ determined in this manner, Eq. (60) can ensure the jth Sub-Filter is fault-free with $(1-P_{MI})$ probability, all other Sub-Filters are non-central chi-square distributed, and the false alert requirement is met.

Least-Squares Fault Detection and Identification
(LS FDE)

It has been found that there is one drawback in using the post-update residual monitoring to perform fault identification. Even with the averaging technique, this form of monitoring may not be able to isolate failures induced by slow pseudorange failure rates (e.g., 0.02 m/s or lower). However, when there are six or more measurements available, the following LS FDE method can be used to complement the post-update residual monitoring method.

As shown in Young, R. S. Y., "Oceanic/Remote FDE Algorithm Design", internal memo, Rockwell Collins Inc., Aug. 16, 1996 and Lee, Y., "New Techniques Relating Fault Detection and Exclusion Performance to GPS Primary Means Integrity Requirements", ION GPS-1995, Palm Springs, Calif., Sep. 12–15, 1995, pp. 1929–1939 hereafter respectively referred to as Refs. [11] and [12], when there are at least six measurements available, the snapshot algorithms can be used to perform fault isolation. Since the performance of the snapshot algorithms is independent of failure rates, they effectively complement the post-update residual monitoring method. The fault isolation algorithm in Ref. [11] requires less computational time since they do not require multiple navigation solutions.

The drawback of using snapshot methods for isolating slow ramp failures is that it requires at least six measurements. Therefore, when there are less than six measurements available and the pseudorange failure rate is slow, the fault identification process may not be able to isolate the failed measurement. In this situation, the HUL should be used to monitor the horizontal position error. If HUL is greater than the HAL for the given phase of flight, the navigation solution from the integrated GPS/inertial sensor should not be used. Otherwise, the navigation solution is tolerable and can still be used.

Post-Exclusion Fault Detection

The second requirement for the fault exclusion indicates that, after the failed measurement is excluded, the HPL based on the remaining measurements (post-HPL) should be less than the HAL for the given phase of flight. The primary purpose of this requirement is to ensure the integrity function can detect another measurement failure that occurs after the first failure is isolated.

If the failed measurement is correctly identified and excluded, the jth Sub-Filter omitting the failed measurement should be fault-free. Therefore, the solution from the jth Sub-Filter can be used to re-initialize the Full-Filter and other Sub-Filters. However, before the failed measurement can be excluded, the second requirement for fault exclusion needs to be met. At the time of fault isolation, the post-exclusion HPL is the $HPL_{H0}$ from the jth Sub-Filter since all filters will be initialized with the same solution. So, if the $HPL_{H0}$ from the jth Sub-Filter is less than the HAL for the given phase of flight, the failed measurement can be excluded.

After the re-initialization, the Full-Filter would only use (N−1) measurements and each Sub-Filter would only use (N−2) measurements. The post-HPL is computed from the HPL algorithm proposed before.

A more thorough understanding of the present invention may be achieved by reviewing the more detailed description below regarding the covariance of the solution separation vector, $B_j(k)$.

COVARIANCE OF THE SOLUTION SEPARATION VECTOR

The computation for the covariance of the solution separation vector, $B_j(k)$, defined in Eq. (8) will be derived here. Since the jth Sub-Filter uses one less measurement than the Full-Filter, there is one pseudorange bias error state used by the Full-Filter, but not by the jth Sub-Filter. However, to simplify the derivation, it is assumed the jth Sub-Filter still carries this unused pseudorange bias error state. It can be shown later that carrying an unused pseudorange bias error state, which is modeled as a first-order Markov process, does not affect the computation of $B_j(k)$ and the performance of the jth Sub-Filter.

The time evolution of estimation errors for the Full-Filter and jth Sub-Filter is shown as follows:

$$\tilde{x}_0(k/k-1) = \Phi(k,k-1)\tilde{x}_0(k-1/k-1) - \omega(k) \quad (A1)$$

$$\tilde{x}_j(k/k-1) = \Phi(k,k-1)\tilde{x}_j(k-1/k-1) - \omega(k) \quad (A2)$$

When the filter processes measurements, these two errors are changed according to $$\tilde{x}_0(k/k) = (I - K_0(k)H_0(k))\tilde{x}_0(k/k-1) + K_0(k)v_0(k) \quad (A3)$$

$$\tilde{x}_j(k/k) = (I - K_j(k)H_j(k))\tilde{x}_j(k/k-1) + K_j(k)v_j(k) \quad (A4)$$

where $K_0(k)$ and $K_j(k)$ are the Kalman gains for the Full-Filter and the jth Sub-Filter, respectively.

By combining Eqs. (A1)–(A4), the evolution of the cross-covariance $P_{0j}(k/k)$ can be computed as follows:

$$P_{0j}(k/k) = \Psi_0(k,k-1)P_{0j}(k-1/k-1)\Psi_j^T(k,k-1) + \Gamma_0(k)Q(k)\Gamma_j^T(k) + K_0(k)R_{0j}(k)K_j^T(k) \quad (A5)$$

where $$\Psi_0(k,k-1) = [I - K_0(k)H_0(k)]\Phi(k,k-1) \quad (A6)$$

$$\Psi_j^T(k,k-1) = \Phi^T(k,k-1)[I - K_j(k)H_j(k)]^T \quad (A7)$$

$$\Gamma_0(k) = [I - K_0(k)H_0(k)] \quad (A8)$$

$$\Gamma_j^T(k) = [I - K_j(k)H_j(k)]^T \quad (A9)$$

$$R_{0j}(k) = E\{v_0(k)v_j^T(k)\} \quad (A10)$$

The observation matrix of the jth Sub-Filter, $H_j(k)$, is related to the observation matrix of the Full-Filter, $H_0(k)$, as follows:

$$H_j(k) = E_j H_0(k) \quad (A11)$$

The measurement covariance of the jth Sub-Filter, $R_j(k)$, is related to the measurement covariance of the Full-Filter, $R_0(k)$, as follows:

$$R_j(k) = E_j R_0(k) E_j \quad (A12)$$

With Eq. (A12), we can see that the jth column and jth row of $R_j(k)$ are all zeros.

$K_j(k)$ is computed as follows:

$$K_j(k) = P_j(k/k) H_j^T(k) R_j^\#(k) \quad (A13)$$

where $R_j^\#(k)$ denotes the Moore-Penrose generalized inverse of the $R_j(k)$ matrix. With Eq. (A13), we can see that the jth measurement is not used by the jth Sub-Filter. Therefore, carrying the pseudorange bias error state for the jth measurement has no effect on the performance of the jth Sub-Filter.

The initial value for $P_{0j}$ can be determined as $$P_{0j}(0/0) = E\{(\hat{x}_0(0/0) - x(0))(\hat{x}_j(0/0) - x(0))^T\} = E\{\hat{x}_0(0/0)\hat{x}_j^T(0/0)\} - E\{x(0)x^T(0)\} \quad (A14)$$

With the initialization specified by Eq. (3), Eq. (A14) can be re-arranged as $$P_{0j}(0/0) = E\{\hat{x}_0(0/0)\hat{x}_0^T(0/0)\} - E\{x(0)x^T(0)\} = P_0(0/0) \quad (A15)$$

With Eqs. (4) and (A15), we can show $$P_{0j}(0/0) = P_0(0/0) = P_j(0/0) = \overline{P}_0 \quad (A16)$$

From Kalman filter theory, we know $$P_0(k/k) = [I - K_0(k)H_0(k)] * [\Phi(k,k-1)P_0(k-1/k-1)\Phi^T(k,k-1) + Q(k)] \quad (A17)$$

Define $$A_j(k) = K_j(k)H_j(k) \quad (A18)$$

With Eqs. (A16)–(A18), Eq. (A5) can be re-arranged as follows for k=1.

$$P_{0j}(1/1) = P_0(1/1) - P_0(1/1)A_j^T(1) + K_0(1)R_{0j}(1)K_j^T(1) \quad (A19)$$

$K_0(1)$ and $R_{0j}(1)$ in Eq. (A19) can be shown as:

$$K_0(1) = P_0(1/1)H_0^T(1)R_0^{-1}(1) \quad (A20)$$

$$R_{0j}(1) = R_0(1)E_j \quad (A21)$$

Now, let us examine the last two terms at the right hand side of Eq. (A19).

$$-P_0(1/1)A_j^T(1) + K_0(1)R_{0j}(1)K_j^T(1) = [-P_0(1/1) + P_0(1/1)]A_j^T(1) = 0 \quad (A22)$$

With Eq. (A22), Eq. (A19) can be simplified as:

$$P_{0j}(1/1) = P_0(1/1) \quad (A23)$$

Now, the process between Eq. (A19) and Eq. (A23) can be repeated for k=2,3 .... Therefore, by induction, Eq. (A23) is valid for all k.

With $P_{0j}(k/k)=P_0(k/k)$ established for all k, $B_j(k)$ can be computed as $$B_j(k)=P_j^h(k/k)-P_0^h(k/k), \quad k=0,1,2,\ldots \quad (A24)$$

where $P_j^h(k/k)$ is the matrix containing the first 2×2 elements of $P_j(k/k)$ and $P_0^h(k/k)$ is the matrix containing the first 2×2 elements of $P_0(k/k)$.

In Ref. [4], a similar result as Eq. (A24) was derived for the more restricted case—a Full-Filter using all measurements and a Sub-Filter using no measurement. Since $P_j^h(k/k)$ and $P_0^h(k/k)$ are already available from the normal Kalman filter processing, $B_j(k)$ can be easily obtained as the difference of these two covariance matrices. Therefore, the special dual covariance propagator used in Refs. [1] and [2] to compute $B_j$ is not required.

Due to Eqs. (A16) and (A24), there is a singular point (B(0)=0) for the fault detection function at initialization. This characteristic is expected since there is no difference between $\hat{x}_0(0/0)$ and $\hat{x}_j(0/0)$.

A more thorough understanding of the present invention can be achieved by reviewing the following conclusory statements: A real-time fault detection and exclusion algorithm is presented for tightly integrated GPS/inertial sensors. The fault detection algorithm is based on normalized solution separation. With normalization, the proper probability levels for the detection threshold and HPL can be obtained. In addition, HPL is predictable without real GPS measurements, which is an important operational requirement.

A hybrid algorithm that combines two independent methods that complement each other is proposed for the fault exclusion function. For medium-to-fast failure rates, the post-update residual monitoring scheme performs better and does not require a minimum of six measurements. For slow failure rates, the least-squares fault identification scheme performs better when there are at least six measurements available. In addition, since it takes an extremely long failure exposure time for slow ramp failures to corrupt the navigation solution to be above HAL, the continuous constellation change due to satellite motion may provide enough observability during some periods of the long failure exposure time to permit the correct fault isolation. During the periods when the correct fault isolation cannot be performed, HUL can be used to monitor the horizontal position error.

It is thought that the system, apparatus and method of the present invention can be understood from the above description. It should be understood that the above description is not exhaustive and is an example of one of many variations of the present invention which could be performed based upon the spirit and scope of the invention. It is the intention of the inventors to claim all such variations within the appended claims.

We claim:

1. An aviation navigation system comprising:
  a global positioning system (GPS) receiver configured to produce GPS signals representative of a geographic location of an aircraft;
  an inertial navigation system (INS) which is configured to monitor acceleration and rotational rate of an aircraft and generate INS signals representative of position, velocity and attitude of said aircraft;
  an integration processor, coupled to said GPS receiver and INS, said integration processor configured to receive said GPS signals and said INS signals and generate a corrected position of said aircraft in response thereto;
  said integration processor computes a multitude of navigation solutions based on different fault hypotheses; and
  said integration processor further comprising a fault detection function and a fault exclusion function; and
  wherein said fault exclusion function is separate and distinct from said fault detection function.

2. A system of claim 1 wherein said fault exclusion function is configured to exclude a fault before said fault detection function detects said fault.

3. A system of claim 1 wherein said fault detection function and said fault exclusion function operate in parallel.

4. A system of claim 2 wherein said fault exclusion function does not include as an input a fault detection from said fault detection function.

5. A system of claim 2 wherein said fault detection function is based on a normalized solution separation scheme and said fault exclusion function utilizes a measurement residual technique.

6. A system of claim 1 wherein said fault detection function further comprises:
  an input from a full filter, which process a plurality of available measurements; and,
  an input from a plurality of sub-filters where each of said plurality of sub-filters excludes a different one of said plurality of available measurements.

7. A system of claim 6 wherein said fault detection function provides a signal representative of a horizontal protection level (HPL) and a horizontal uncertainty level (HUL) and wherein said system is an open loop system without feedback to said GPS receiver and said INS.

8. A system of claim 1 wherein said fault exclusion function further comprises:
  an input from said plurality of sub-filters where each of said plurality of sub-filters excludes a different one of said plurality of available measurements; and,
  an input from a least squares solution function which utilizes all of said plurality of available measurements.

9. A system of claim 5 wherein said normalized solution separation scheme determines a covariance of the solution separation vector, $B_j(k)$, where $B_j(k)=P_j^h(k/k)-P_0^h(k/k)$ with $P_j^h(k/k)=E\{\tilde{x}_j^h(\tilde{x}_j^h)^T\}$ and $P_0^h(k/k)=E\{\tilde{x}_0^h(\tilde{x}_0^h)^T\}$.

10. A system of claim 8 wherein said fault exclusion function issues a re-initialization signal.

11. A navigation system comprising:
  means for determining a geographic location of an object in response received satellite signals;
  means for monitoring acceleration and rotational rate of said object;
  means for integrating outputs from said means for determining and said means for monitoring; and
  wherein said means for integrating comprises a means for fault detection and a means for fault exclusion which function independently and are based on a multitude of navigation solutions.

12. A system of claim 11 wherein said means for fault exclusion further comprises means for post update residual monitoring and means for determining a least square solution of a plurality of available measurements.

13. A system of claim 11 wherein said means for fault detection uses a normalized approach to determine statistical properties of a test statistic.

14. A system of claim 11 wherein said means for fault detection generates a horizontal protection level and a horizontal uncertainty level.

15. A method of improving integrity of position information of a navigation system comprising the steps of:

determining a plurality of locations of a moving object using signals from a plurality of global positioning system satellites;

monitoring acceleration and attitude characteristics of said object using an inertial sensor;

detecting faults in said plurality of locations, by using a detection test statistic in a first domain;

excluding faults from said plurality of locations, by using an exclusion test statistic in a second domain; and wherein said first domain and said second domain are different.

16. A method of claim 15 wherein said first domain is position and said second domain is range.

17. A method of claim 16 wherein said step of detecting further comprises generating a horizontal protection level signal, a horizontal uncertainty level signal and covariance of solution separation vector computed as $B_j(k)=P_j^h(k/k)-P_0^h(k/k)$ with $P_j^h(k/k)=E\{\tilde{x}_j^h(\tilde{x}_j^h)^T\}$ and $P_0^h(k/k)=E\{\tilde{x}_0^h(\tilde{x}_0^h)^T\}$.

18. A method of claim 17 wherein said step of excluding faults further comprises the steps of performing a post update residual monitoring and a determining a least squares solution.

19. A method of claim 18 wherein said steps of performing a post update residual monitoring and determining a least squares solution are done in parallel.

20. A method of claim 19 wherein said step of detecting faults and said step of excluding faults are done in a parallel and independently.

* * * * *